US008925329B2

(12) United States Patent
Godel et al.

(10) Patent No.: US 8,925,329 B2
(45) Date of Patent: Jan. 6, 2015

(54) METHOD OF TESTING A SYSTEM FOR PROTECTING A TURBOMACHINE AGAINST OVERSPEED WHILE STARTING

(75) Inventors: Franck Godel, Chartrettes (FR); Nicolas Marie Pierre Gueit, Paris (FR); Julien Marcel Roger Maille, Saint Cheron (FR)

(73) Assignee: SNECMA, Paris (FR)

( * ) Notice: Subject to any disclaimer, the term of this patent is extended or adjusted under 35 U.S.C. 154(b) by 622 days.

(21) Appl. No.: 13/377,225

(22) PCT Filed: Jun. 2, 2010

(86) PCT No.: PCT/FR2010/051072
§ 371 (c)(1),
(2), (4) Date: Dec. 9, 2011

(87) PCT Pub. No.: WO2010/142886
PCT Pub. Date: Dec. 16, 2010

(65) Prior Publication Data

US 2012/0085101 A1 Apr. 12, 2012

(30) Foreign Application Priority Data

Jun. 10, 2009 (FR) .................................... 09 53835
Jun. 25, 2009 (FR) .................................... 09 54349

(51) Int. Cl.

| | |
|---|---|
| ***F02C 7/22*** | (2006.01) |
| ***F02C 7/00*** | (2006.01) |
| ***F02C 7/26*** | (2006.01) |
| ***G01M 15/00*** | (2006.01) |
| ***F01D 21/00*** | (2006.01) |
| ***F01D 21/02*** | (2006.01) |
| ***F01D 21/20*** | (2006.01) |

(52) U.S. Cl.
CPC .............. *F01D 21/003* (2013.01); *F01D 21/02* (2013.01); *F01D 21/20* (2013.01); *F05D 2270/021* (2013.01)
USPC ............... 60/778; 60/779; 60/786; 73/112.01

(58) Field of Classification Search
USPC .................. 60/778, 779, 39.091, 39.13, 786; 73/112.01
See application file for complete search history.

(56) References Cited

U.S. PATENT DOCUMENTS 5,107,674 A * 4/1992 Wibbelsman et al. .......... 60/778
5,927,064 A 7/1999 Byer et al.

(Continued)

FOREIGN PATENT DOCUMENTS

EP 1 036 917 9/2000
EP 1 217 190 6/2002

(Continued)

OTHER PUBLICATIONS

International Search Report Issued Sep. 1, 2010 in PCT/FR10/51072 Filed Jun. 2, 2010.

*Primary Examiner* — Gerald L Sung
(74) *Attorney, Agent, or Firm* — Oblon, Spivak, McClelland, Maier & Neustadt, L.L.P.

(57) ABSTRACT

In a testing overspeed protection system: a) on receiving an order to start a turbomachine, an electronic regulation system (ERS) of the turbomachine sends an order to a control circuit of a fuel cutoff member to close the fuel cutoff member or to keep it in the closed position; b) the closed state of the FCM is verified on the basis of information transmitted to the ERS and representative of the position of the FCM; c) if the result of the verification in b) is positive, the ERS sends an order to the FCM control circuit to authorize opening of the FCM and enable the starting procedure to continue; and d) if the result of the verification in b) is negative, the ERS issues fault information concerning the overspeed protection system.

12 Claims, 5 Drawing Sheets

(56) References Cited

U.S. PATENT DOCUMENTS

| | | | |
|---|---|---|---|
| 6,393,353 | B1 | 5/2002 | Brocard et al. |
| 8,578,763 | B2 * | 11/2013 | Heitz et al. ................. 73/114.41 |
| 2002/0078693 | A1 | 6/2002 | Maillard et al. |
| 2008/0101918 | A1 | 5/2008 | Block et al. |
| 2011/0041512 | A1 * | 2/2011 | Tezuka et al. ................... 60/779 |

FOREIGN PATENT DOCUMENTS

| | | |
|---|---|---|
| EP | 1 918 530 | 5/2008 |
| FR | 2 923 871 | 5/2009 |
| WO | 99 32772 | 7/1999 |

* cited by examiner

METHOD OF TESTING A SYSTEM FOR PROTECTING A TURBOMACHINE AGAINST OVERSPEED WHILE STARTING

BACKGROUND OF THE INVENTION

The invention relates to testing the system for protecting a turbomachine against overspeed, the test being performed during starting of the engine. The invention is applicable to aeroengines and to industrial turbines.

An excessive speed of rotation in a turbine engine, known as overspeed, can have particularly severe consequences, in particular it can lead to turbine rotor disks bursting, with destructive effects on the engine.

An engine is therefore generally fitted with a system for protecting it against overspeed.

In usual manner, such a system includes a cutoff valve inserted in the circuit for feeding the combustion chamber of the engine with fuel. Overspeed is detected by an electronic overspeed protection unit when the speed of rotation of a turbine shaft exceeds a limit value or overspeed threshold. When overspeed is detected, the electronic overspeed protection unit sends a command to close the cutoff valve or to reduce its flow section via various components of electronic, electrohydraulic, or hydraulic type. Together with the cutoff valve, these various components form parts of the overspeed protection system.

It is known to incorporate a test of the overspeed protection system in the procedure for automatically starting an engine. Reference may be made to application EP 1 036 917 A1. That describes a process whereby, once the engine has begun to rotate on being driven by the starter, the speed threshold is given a test value. The test value is selected to be substantially below the ignition speed, i.e. the speed of rotation at which fuel is injected into the combustion chamber. When the speed of rotation exceeds the test overspeed threshold, it is verified that the overspeed protection system has operated properly. If so, then when the ignition speed is reached, the overspeed threshold is switched from its low test value to a real value.

In that known test process, verification is performed by detecting the position of the core of a fuel metering unit that is taken to its minimum position by a hydraulic device controlled by the electronic regulation system of the engine and that, in this minimum position, causes the cutoff valve to be closed. There is thus no actual verification that the cutoff valve reaches its closed position. In addition, the effectiveness of the overspeed protection function after testing assumes that the changeover of the overspeed threshold from the low, test value to the real value takes place correctly.

OBJECT AND SUMMARY OF THE INVENTION

The invention seeks to provide a method that is simple and reliable for testing the overspeed protection system of a turbomachine during starting, the protection system including a fuel cutoff member and a control circuit for the cutoff member connected to an electronic regulation system of the turbomachine to cause the cutoff member to be closed to interrupt or reduce the feeding of fuel to a combustion chamber of the turbomachine in response to detecting overspeed, the method comprising the following test sequence:

a) on receiving an order to start the turbomachine, the electronic regulation system sending an order to the control circuit of the cutoff member to close the cutoff member or to keep it in the closed position;

b) the electronic regulation verifying the closure state of the cutoff member on the basis of information received representative of the open or closed position of the cutoff member;

c) when the result of the verification in step b) is positive, the electronic regulation system sending an order to the control circuit of the cutoff member to authorize opening of the cutoff member and continue with the procedure for starting the turbomachine; and d) when the result of the verification in step b) is negative, the electronic regulation system issuing a fault signal relating to the overspeed protection system.

Thus, the operation of the overspeed protection system is tested by directly verifying that the cutoff member reaches its closed position in response to an order from the electronic regulation system of the turbomachine. In addition, when closure of the cutoff member is controlled by an electronic overspeed protection unit, that is distinct from the electronic regulation system of the turbomachine, testing of the overspeed protection system is not managed by the electronic overspeed protection unit but rather by the electronic regulation system that includes resources that are appropriate for managing complex functions. In addition, the state of health of the overspeed protection system is finally determined by the electronic regulation system, which is generally the only system that is in communication with the systems for managing airplane maintenance, thereby conserving a common interface with such systems for managing maintenance.

According to a feature of the method, the test sequence further comprises:

e) after step c), verifying that the cutoff member has passed into the open position; and f) when the result of the verification in step e) is negative, the electronic regulation system issuing the fault signal concerning the overspeed protection system.

This verifies the overspeed protection system both for its ability to close the cutoff member and for its ability to authorize opening of the cutoff member during a stage of starting in manual mode.

According to a feature of the method, when the control circuit of the cutoff member comprises a hydraulic device for closing the cutoff member and an electronic overspeed protection unit for protection against overspeed connected to the hydraulic device for controlling closure, the orders to close the cutoff member or to keep it closed and to authorize opening of the cutoff member are transmitted over a communications bus between the electronic regulation system of the engine and the electronic overspeed protection unit.

The position of the cutoff member may be verified on the basis of a signal supplied by a position sensor for sensing the position of a movable element of the cutoff member.

In an implantation of the method for testing the overspeed protection system when starting the turbomachine in automatic mode, the test sequence is inserted in the starting sequence so as to terminate before opening of the cutoff member is required in accordance with the procedure for starting the turbomachine in automatic mode.

The test sequence may then include, in step a), sending an order to close the previously-open cutoff member.

When starting in automatic mode, the starting process follows a predetermined scenario such that it is possible for the testing of the overspeed protection system to be incorporated in "transparent" manner in the starting process, without disturbing it. The same does not apply when starting in manual mode, specifically since it is the pilot or some other operator who decides on the instant when the cutoff member is opened for ignition, such that the test using the method of the invention cannot be performed while also guaranteeing that the starting process remains undisturbed. Consequently, in the first implementation of the invention, the test sequence is preferably inhibited in the event of starting in manual mode.

Under such circumstances, and preferably, the number of consecutive starts in manual mode is counted by the electronic regulation system, which issues information requesting testing of the overspeed protection system during maintenance when the counted value exceeds a predetermined threshold. This avoids too great a number of starts being performed without the overspeed protection system being tested.

In a second implementation of the method for testing the overspeed protection system while starting the turbomachine in manual mode, the test sequence includes, in step a), sending an order to keep the cutoff member in the closed position in response to a start order.

The invention thus enables a test of the overspeed protection system to be inserted in the procedure for starting in manual mode. By forcing the cutoff member to remain closed beyond the normal period in which it opens following an order to start in manual mode, the method of the invention nevertheless presents a nature that is intrusive compared with the normal functioning of a manual start, and that can lead to a delay in actual ignition.

That is why, when testing the overspeed protection system of an airplane engine, the electronic regulation system is preferably arranged to allow the test to be performed only when the aircraft is on the ground, in order to avoid any delay of re-ignition while in flight.

Also preferably, a test is performed in application of the second implementation when the number of consecutive manual starts without testing the overspeed protection system reaches or exceeds a predetermined value.

Thus, firstly the overspeed protection system is not tested on every manual start, thereby avoiding any disturbance to manual mode starting if manual starting is occasional and isolated. Secondly, in the event of a plurality of consecutive starts being performed in manual mode, i.e. without any intervening automatic start, this avoids too great a number of starts being performed without the overspeed protection system being tested.

The number of consecutive starts in manual mode without testing may be counted by means of a counter that is reintialized each time a test is performed, whether starting in manual mode or in automatic mode.

BRIEF DESCRIPTION OF THE DRAWINGS

The invention can be better understood on reading the following description made by way of non-limiting indication and with reference to the accompanying drawings, in which.

DETAILED DESCRIPTION OF EMBODIMENTS

Figure 1:
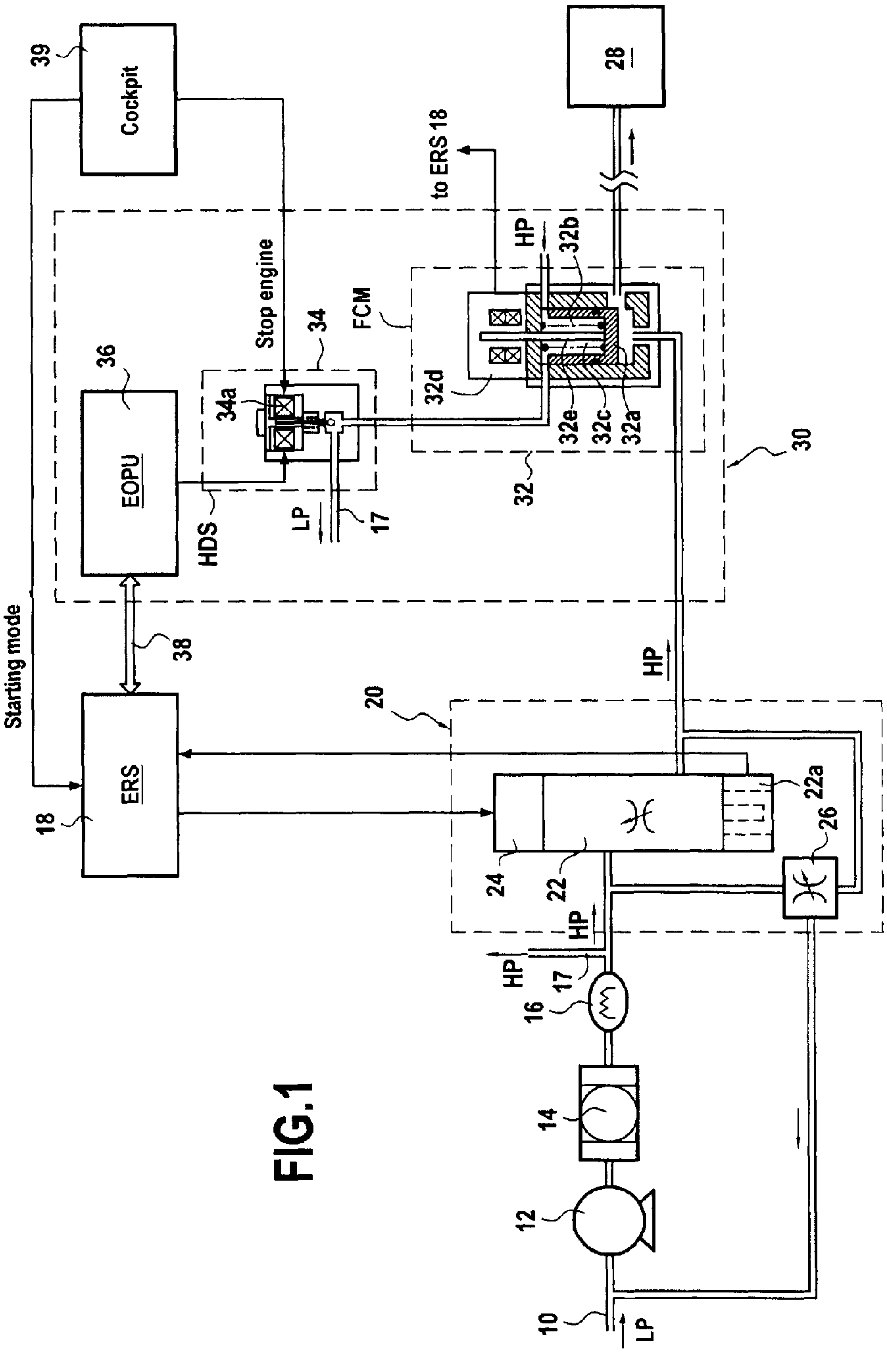
FIG. 1 is a diagram of a fuel feed circuit to a turbomachine.

FIG. 1 shows an example of a fuel feed circuit for a turbomachine, e.g. an airplane gas turbine engine.

Low pressure (LP) fuel coming from a fuel tank via an LP pump (not shown) is taken by an LP fuel circuit 10 to the inlet of a high pressure (HP) pump 12. By way of example, the HP pump 12 is a positive displacement pump driven by means of an accessory gearbox that is mechanically coupled to a turbine shaft of the engine.

HP fuel delivered by the pump 12 is taken to a metering unit 20 via a filter 14 and a heat exchanger 16 where the fuel is heated by exchanging heat with the lubricating oil of the engine. A portion of the HP fuel at the output from the heat exchanger 16 is used as a hydraulic fluid for various hydraulic or electrohydraulic components of the engine.

By way of example, the metering unit 20 comprises a variable-opening metering valve 22 controlled by a servo-valve 24. A valve 26 maintains a constant pressure difference between the fuel inlet and outlet of the metering valve so that the flow of fuel delivered by the metering valve 22 is determined by the flow section therethrough. The flow rate is regulated by the servo-valve 24 under the control of an electronic regulator system (ERS) 18 of the engine by servo-controlling the position of a core of the valve 22 to a setpoint position corresponding to the desired flow section. For this purpose, information representing the real position of the core of the valve 22 is supplied to the ERS 18 by a position sensor 22*a*, e.g. of the linear variable differential transducer (LVDT) type that is associated with a rod that is secured to the core of the valve. Excess fuel at the inlet to the metering unit is diverted to the LP fuel circuit by the valve 26.

The regulated flow of HP fuel at the outlet from the metering unit 20 is taken to the injectors of a combustion chamber 28 of the engine via a fuel cutoff member 32. The term "fuel cutoff member" is used herein to mean a component suitable for completely interrupting the flow of fuel towards the combustion chamber or for limiting said flow to a minimum value on being totally or partially closed under the control of the ERS 18 in the event of engine overspeed being detected.

In the example shown, the fuel cutoff member (FCM) 32 is a valve having a slide 32*a* of position that determines the flow section through the valve. On one side, the slide 32*a* is subjected to the action of a spring 32*b* and to the pressure in a chamber 32*c*, and on the other side it is subjected to the pressure at the inlet of the valve 32 connected to the metering unit 20. The chamber 32*c* has an inlet port receiving the HP fuel and an outlet port connected to the LP fuel circuit 10 via a dedicated overspeed device HDS 34. This device is in the form of a solenoid valve with an excitation winding 34*a*. When the winding 34*a* is powered, the solenoid valve 34 is taken to its closed position and held there. The slide 32*a* is then brought, with the help of the spring 32*b* and the pressure in the chamber 32*c*, into a position for closing the valve 32. When the winding 34*a* is not powered, the solenoid valve 34 opens and the slide 32*a* can be moved into an open position by the pressure of the fuel reaching the valve 32 from the metering unit. A signal representative of the closed or open position of the valve 32 is supplied by a position sensor 32*d*, e.g. of the LVDT type, that co-operates with a rod 32*e* secured to the slide 32*a*. This signal is sent directly to the ERS 18.

The valve 32 may also be caused to open by the ERS 18.

The overspeed device HDS 34 is controlled by an electronic overspeed protection unit (EOPU) 36 that communicates with the ERS 18 via a communications bus, e.g. in the ARINC format. In response to a closure order issued by the ERS 18, the EOPU 36 produces an excitation signal for the winding 34*a* suitable for holding the overspeed device HDS 34 in its closed position. The components 32 (together with the position sensor 32*d*), 34, and 36 thus form the overspeed protection system 30 herein. Naturally, the FCM 32 and the overspeed device HDS 34 could be implemented other than by using a valve and a solenoid valve, it optionally being possible for the overspeed device HDS 34 to be constituted by a plurality of components incorporated in the system between the EOPU 36 and the FCM 32. Stopping of the engine by closing the FCM 32 may be controlled from the cockpit by opening the solenoid valve 34.

The ERS 18 is connected to the airplane cockpit 39 in particular to receive information indicating the starting mode selected by the pilot: automatic or manual.

A first implementation of the procedure for testing the overspeed protection system, applicable to starting the engine in automatic mode, is described below with reference to FIG. 2.

As is itself well known, the process for starting in automatic mode is managed chronologically by the ERS 18 as from launch and in compliance with the speed of the engine (speed of rotation of the turbine shaft), the ERS 18 acting successively to put the starter into operation, to actuate the ignition system, and to control the rate at which fuel is injected.

Figure 2:
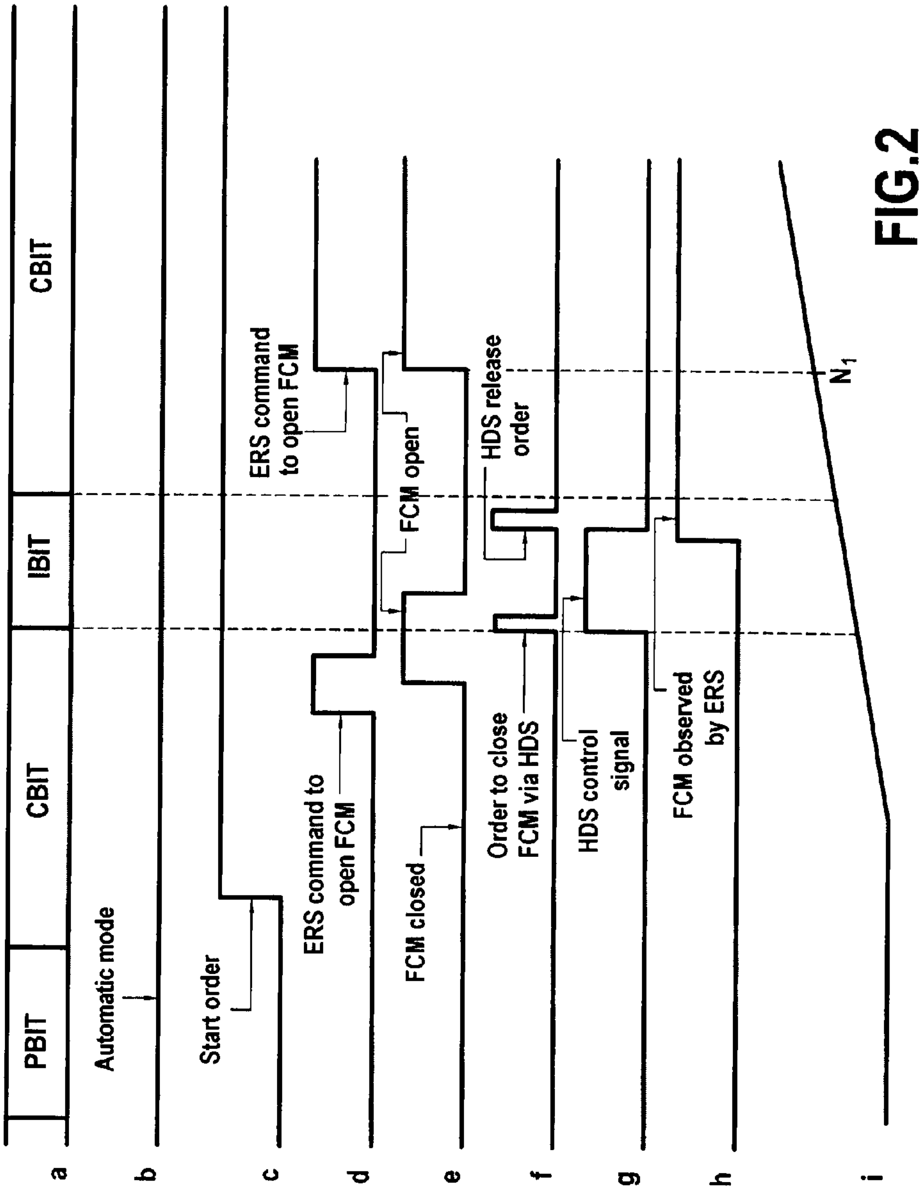
FIG. 2 is a timing chart of signals received or transmitted in an overspeed protection system, and of states of components thereof during a test procedure in the event of starting in automatic mode, in a first implementation of the invention.

In FIG. 2:

line a shows the successive stages of the test procedure;

line b shows the status of the starter module of the engine;

line c shows the instant at which the starting process is launched by the pilot (start order);

line d shows the command from the ERS for opening the FCM;

line e shows the open or closed position of the FCM;

line f shows the orders issued by the ERS over the bus connecting the ERS to the EOPU;

line g shows the state of the control signal issued by the EOPU to the overspeed device HDS;

line h shows the window used by the ERS for observing the position of the FCM; and line i shows the speed N of the engine.

On line a, the stages PBIT and CBIT are respectively a stage of automatically testing internal logic on switching on the EOPU and a stage of continuously testing the inputs/outputs of the EOPU. These are automatic internal test stages that are conventionally implemented on electronic circuits.

On switching on, the stages PBIT and CBIT are performed (line a). Since the selected starting mode is automatic (line b), the ERS initiates the preparation and the performance of a test of the overspeed protection system (stage IBIT) in response to the start order (line c).

Since the FCM is initially closed, an order to open the FCM is issued by the ERS (line d) before the beginning of the IBIT test stage proper. In response to this order, the FCM opens (line e). Simultaneously, the engine begins to rotate under the action of the starter and its speed N begins to increase (line i).

The test stage IBIT proper can begin as soon as the FCM is open. It should be observed that prior opening of the FCM is naturally not required if it was initially open.

The test stage IBIT begins by the ERS sending to the EOPU an order to close the FCM via the overspeed device HDS (line d).

The EOPU acknowledges receipt of this order via the bus that connects it to the ERS and in response it prepares a signal for exciting the overspeed device HDS (line d) suitable for causing the FCM to close. In response, the FCM passes into the closed position (line e).

The position of the FCM is continuously monitored by the ERS.

If it is found that the FCM is in its closed position before the end of a timeout T corresponding to the time required for the EOPU to close the FCM via the overspeed device HDS after the ERS has issued the closure order, then the ERS sends an order to the EOPU to release the overspeed device HDS (line f). The EOPU acknowledges reception of this order and interrupts the signal exciting the overspeed device HDS (line g), thus allowing the FCM to open.

On receiving the acknowledgment of receipt of the order to release the overspeed device HDS, and on said order being executed, the EOPU returns to the internal test stage CBIT.

The starting process continues normally and the ERS can act (line d) to cause the FCM to take up the open position (line e). This command normally occurs in the starting process in automatic mode when the speed N of the engine reaches a predetermined value $N_1$ that is a function of the maximum speed authorized on the ground. The open position of the FCM is then verified by the ERS.

The stage IBIT of testing the overspeed protection system is incorporated in the starting process so as to terminate well before the speed $N_1$ is reached, with this not giving rise to any difficulty since several tens of seconds generally elapse between the start order and the instant at which the threshold $N_1$ is reached.

By concatenating the results of verifying the closed and the open positions of the FCM and the results of the automatic internal tests of the EOPU (which results are made available to the ERS via the bus 38), it is possible for the ERS to decide on the state of health of the overspeed protection system and to issue a fault signal concerning the system if at least one of the results is not positive. By way of example, the fault signal may be forwarded to the cockpit so as to make it possible to decide whether to abandon takeoff and interrupt the starting process if the test is performed on the ground prior to takeoff, or so as to decide on inspecting the components of the overspeed protection system if the test is performed during maintenance.

It should be observed that in its minimum configuration, the test includes verifying that the FCM reaches the closed position.

The above-described test procedure is incorporated in transparent manner in the starting process, with this being made possible by the predictable nature thereof in automatic mode.

The same does not apply when starting in manual mode, specifically since the instant at which the cutoff member is open is selected by the pilot.

Figure 3:
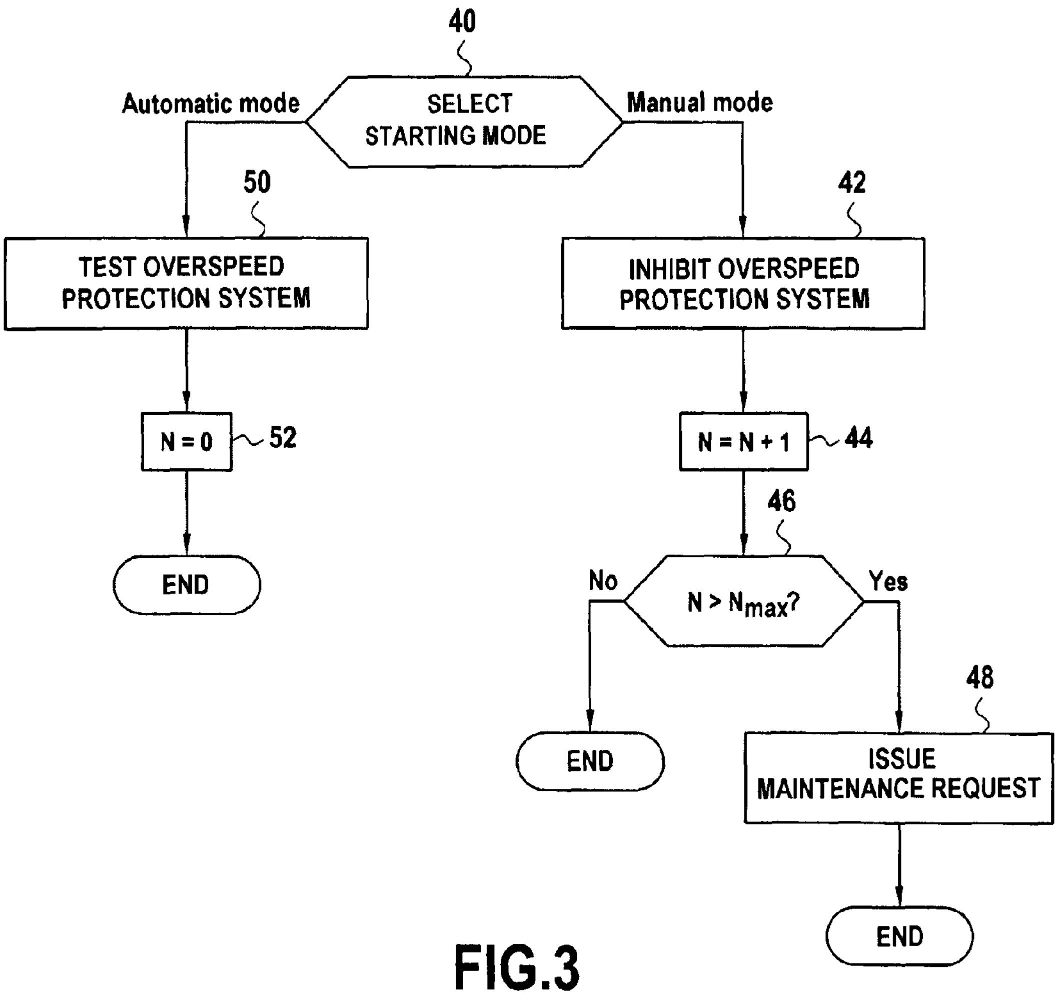
FIG. 3 is a flow chart of a method of managing the testing of an overspeed protection system.
Figure 4:
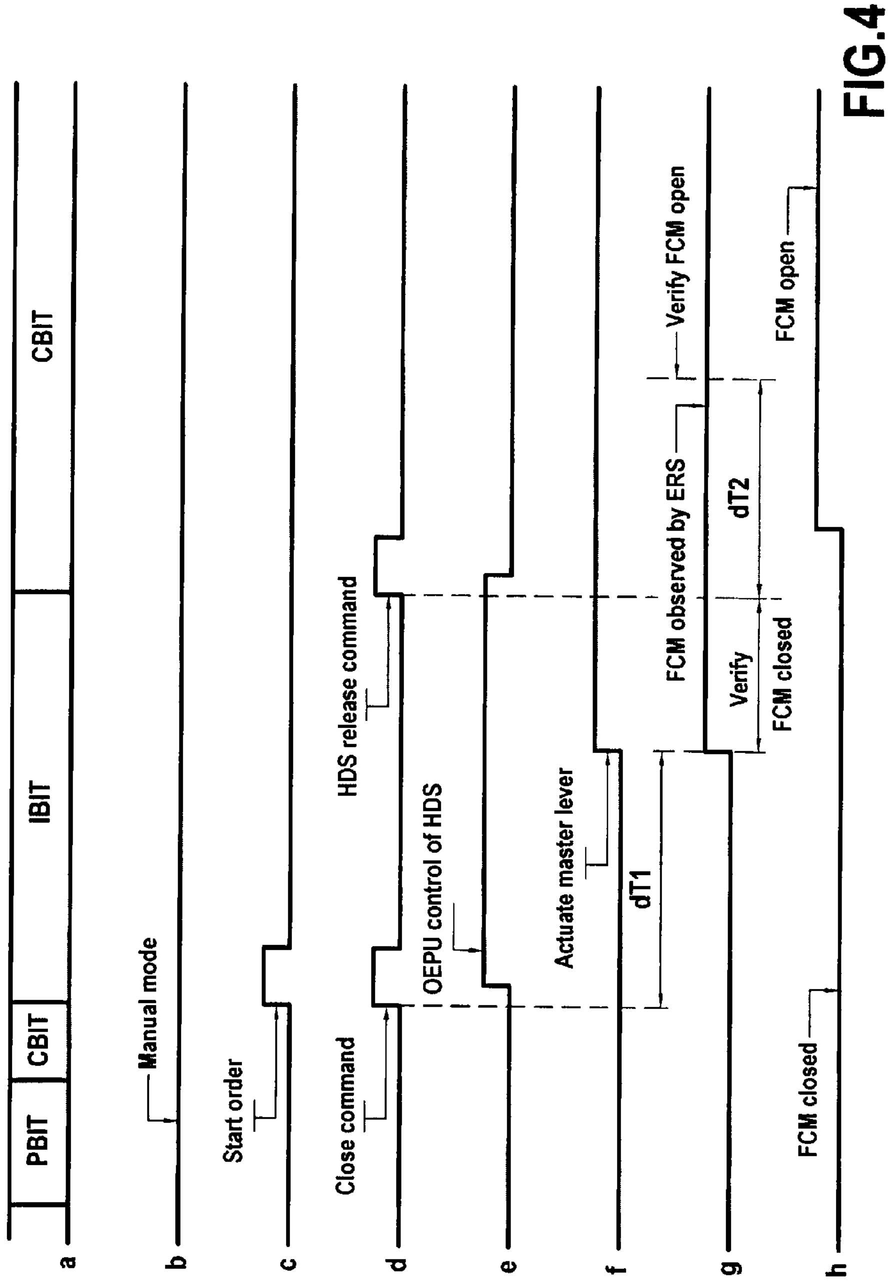
FIG. 4 is a timing chart of signals emitted or transmitted by an overspeed protection system and of states of components thereof during a starting test procedure in manual mode, in a second implementation of the invention.
Figure 5:
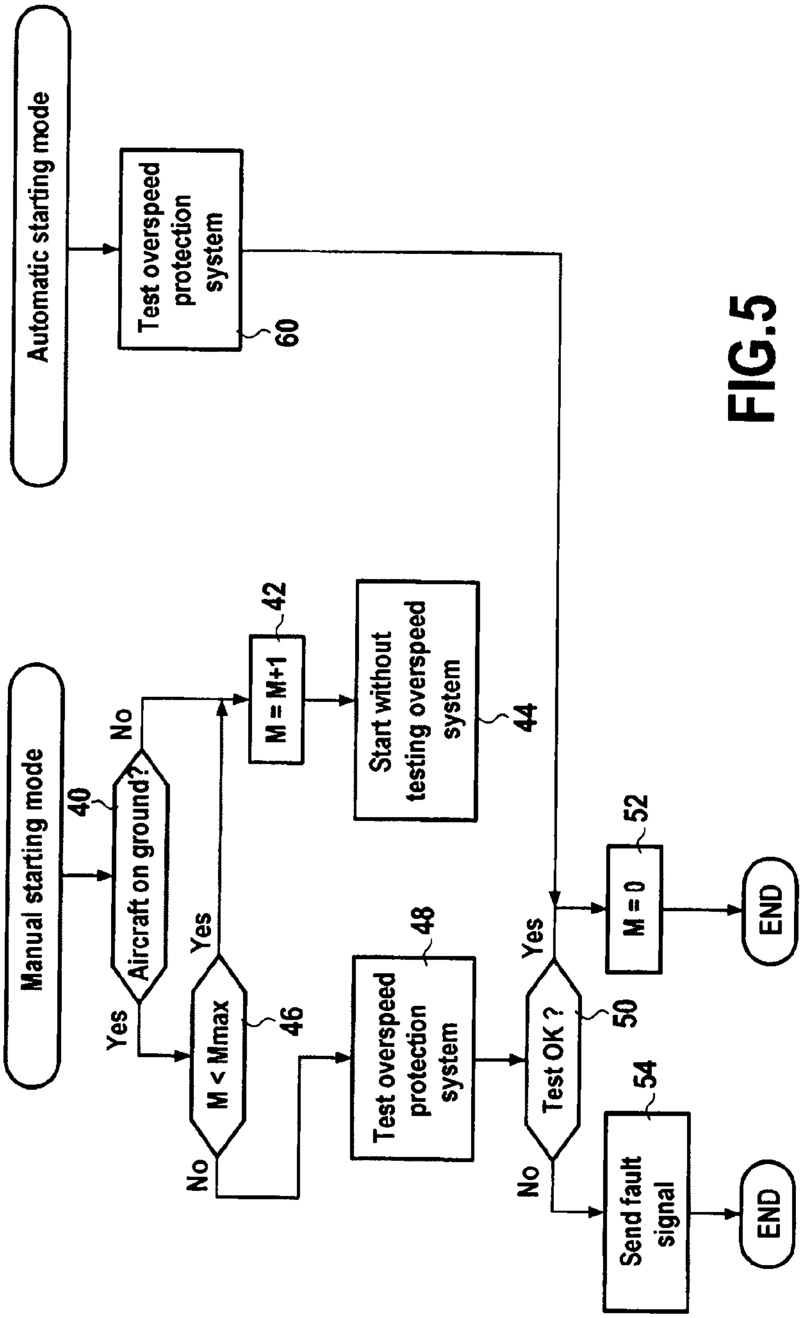
FIG. 5 is a flow chart of another method of managing testing of an overspeed protection system.

Thus, when manual starting mode is selected, it is possible either to perform the test on the overspeed protection system in application of the second implementation of the invention as described below with reference to FIGS. 4 and 5, or else to perform no tests of the overspeed protection system. If no test is performed, it is nevertheless desirable to avoid repeatedly performing no test and to indicate that it is necessary to perform a test during maintenance in the event that several consecutive starts have been performed without testing. FIG. 3 shows a method of managing the testing of the overspeed protection system that is then implemented for this purpose by the electronic regulation system of the engine.

If it is detected by the electronic regulation system that the manual starting mode is selected (test 40), then testing of the overspeed protection system is inhibited (step 42). The content N of a counter of test-free starts is incremented (N=N+1) in step 44. It is verified (test 46) whether the number N is greater than a maximum threshold value $N_{max}$. If so, information is issued by the electronic regulation system to request maintenance to test the overspeed protection system (step 48). The maintenance test is performed in automatic start mode in accordance with the invention, e.g. as described with reference to FIG. 2. It should be observed that the value N of the counter is preferably stored in a non-volatile memory of the electronic regulation system. By way of example, the number $N_{max}$ is selected to be such that $N_{max} \leq 8$.

If it is detected (test 40) that automatic start mode is selected, whether in operation or during maintenance, then the overspeed protection system is tested in accordance with the invention (step 50) and the counter for counting the number N is reinitialized (N=0) in step 52.

A second implementation of a procedure for testing the overspeed protection system in the event of the engine being started in manual mode is described below with reference to FIG. 4.

Line a shows the successive stages of the test procedure;

Line b shows the status of the engine start mode;

Line c shows the instant of starting by the pilot (start order);

Line d shows the orders issued over the bus connecting the ERS to the EOPU;

Line e shows the state of the control signal issued by the EOPU to the overspeed device HDS;

Line f shows the instant at which the pilot actuates the master lever with the valve opening if it is found that fuel is present;

Line g shows the state of the observation by the ERS of the position of the FCM; and Line h shows the position of the FCM.

In line a the stages PBIT to CBIT are respectively a stage of automatically testing internal logic when the EOPU is switched on, and a stage of continuously automatically testing the inputs/outputs of the EOPU. These are automatic internal tests that are performed conventionally in electronic circuits.

On switching on, the PBIT and CBIT stages are performed (line a). Since the selected starting mode is manual (line b), as detected by the ERS, a procedure for testing the overspeed protection system in accordance with the invention (stage IBIT) is initiated in response to the ERS detecting a start order (line c).

The ERS then sends to the EOPU an order to close the FCM (line d). The EOPU acknowledges reception of the order via the bus and transforms it into a control signal for the overspeed device HDS to keep the FCM in the closed position, the FCM being initially closed (line g).

Thus, initiating the test inhibits opening of the FCM, where such opening occurs, when performing a manual start without testing the overspeed protection system, at the time after the start order that the engine speed becomes sufficient to raise the pressure of the fuel above the threshold for opening the FCM.

Verification of the closed position of the FCM is authorized (line g) after a time interval $dT_1$ that is greater than the normal time interval for opening the FCM after the start order. This may be a predetermined time interval, e.g. not less than 0.5 seconds (s), typically lying in the range 0.5 s to 2 s. Verification of the closed position by the ERS may also begin, as in the example shown, in response to the pilot actuating the master lever (line f), this actuation necessarily presenting a delay that is sufficient relative to the start order.

If it is verified that the FCM is in the closed position, the ERS sends an order to the EOPU to release the overspeed device HDS so as to enable the FCM to open (line d). The EOPU acknowledges reception of this order via the bus and releases the overspeed device HDS (line e).

After a predetermined time interval $dT_2$ that is longer than a normal FCM opening time interval, the open position of the FCM is verified by the ERS. The time interval $dT_2$ may be selected to be equal or substantially equal to $dT_1$. Once the overspeed device HDS has been released the EOPU continues its processing of background tasks including the CBIT internal test.

By concatenating the results of verifying the kept-closed and the open positions of the FCM and the results of the automatic internal tests of the EOPU (which results are made available to the ERS via the bus 38), it is possible for the ERS to decide on the state of health of the overspeed protection system and to issue a fault signal concerning the system if all of the results are not positive. By way of example, the fault signal may be forwarded to the cockpit so as to make it possible to decide whether to abandon takeoff.

It should be observed that in its minimum configuration, the test includes verifying that the FCM is held in the closed position, preferably after a time interval has elapsed that is longer than the time it takes to open normally after the start order.

The above-described test procedure is of a nature that is intrusive compared with manual mode starting without testing the overspeed protection system, because of the delay it puts on opening the FCM. Although this delay can be very limited in practice, e.g. less than one second, it may be preferable not to perform the test systematically on every start in manual mode, but only after a certain number of consecutive manual starts have been performed without testing. It is also preferable to avoid testing when performing a manual mode start in flight, with the system then preventing execution of the test during a manual start under flying conditions.

An implementation of a procedure for managing in this way the testing of the overspeed protection system in manual start mode is described below with reference to FIG. 5. This procedure is implemented by means of a program by the ERS.

The number M of successive starts in manual mode without performing an overspeed protection system test is counted by means of a counter that has a content stored in a non-volatile memory of the ERS.

In the event of manual mode starting being selected, it is examined (40) whether the aircraft is on the ground, on the basis of data that is available in the ERS. If not, the number M is incremented by unity (42) and manual mode starting is performed without testing the overspeed protection system (44). If the aircraft is on the ground, it is examined (46) whether the number M is less than a predetermined maximum number $M_{max}$ that is greater than or equal to 1, e.g. lying in the range 1 to 50. If $M < M_{max}$, then the method moves on to steps 42 and 44. If $M \geq M_{max}$, then a test is performed (48) of the overspeed protection system, e.g. as described above with reference to FIG. 2. If the result of the test is positive (50), the content M of the counter is reset to zero (52) and the procedure is terminated. If the result of the test is negative, a fault signal concerning the overspeed protection system is issued (54) by the ERS, and the procedure terminates.

If starting in automatic mode is selected, a test is performed (60) of the overspeed protection system, this test being "transparent" to the automatic starting sequence. The content M of the counter is reset to zero.

In the above detailed description, it is assumed that the invention is applied to airplane gas turbine engines. Nevertheless, the method of testing the overspeed protection system can be implemented with other types of turbomachines.

The invention claimed is:

1. A method of testing a system for protecting a turbomachine against overspeed during starting of the turbomachine, the protection system including a fuel cutoff member and a circuit for controlling the cutoff member that is connected to an electronic regulation system of the engine to cause the cutoff member to close to interrupt or reduce the supply of fuel to a combustion chamber of the turbomachine in response to overspeed being detected, the method comprising the following test sequence:

a) on receiving an order to start the turbomachine, the electronic regulation system sending an order to the control circuit of the cutoff member to close the cutoff member or to keep the cutoff member in the closed position;

b) the electronic regulation verifying the closure state of the cutoff member on the basis of information received representative of the open or closed position of the cutoff member;

c) when the result of the verification in step b) is positive, the electronic regulation system sending an order to the control circuit of the cutoff member to authorize opening of the cutoff member and continue with the procedure for starting the turbomachine; and d) when the result of the verification in step b) is negative, the electronic regulation system issuing a fault signal relating to the overspeed protection system.

2. A method according to claim 1, wherein the test sequence further comprises:

e) after step c), verifying that the cutoff member has passed into the open position; and f) when the result of the verification in step e) is negative, the electronic regulation system issuing the fault signal concerning the overspeed protection system.

3. A method according to claim 1, wherein the control circuit of the cutoff member comprises a hydraulic device for closing the cutoff member and an electronic overspeed protection unit for protection against overspeed connected to the hydraulic device for controlling closure, and the orders to close the cutoff member or to keep the cutoff member closed and to authorize opening of the cutoff member are transmitted over a communications bus between the electronic regulation system of the turbomachine and the electronic overspeed protection unit.

4. A method according to claim 1, wherein the position of the cutoff member is verified on the basis of a signal supplied by a position sensor for sensing the position of a movable element of the cutoff member.

5. A method according to claim 1 for testing the overspeed protection system when starting the turbomachine in automatic mode, wherein the test sequence is inserted in the starting sequence so as to terminate before opening of the cutoff member is required in accordance with the procedure for starting the turbomachine in automatic mode.

6. A method according to claim 5, wherein the test sequence includes, in step a), sending an order to close the previously-open cutoff member.

7. A method according to claim 5, wherein the test sequence is inhibited in the event of starting in manual mode.

8. A method according to claim 7, wherein the number of consecutive starts in manual mode is counted by the electronic regulation system, which issues information requesting testing of the overspeed protection system during maintenance when the counted value exceeds a predetermined threshold.

9. A method according to claim 1, for testing the overspeed protection system while starting the turbomachine in manual mode, wherein the test sequence includes, in step a), sending an order to keep the cutoff member in the closed position in response to a start order.

10. A method according to claim 9, for testing the overspeed protection system of an airplane engine, wherein the electronic regulation system is arranged to allow the test to be performed only when the aircraft is on the ground.

11. A method of managing the testing of turbomachine protection against overspeed, in which a test is performed according to claim 9 when the number of consecutive starts without testing the overspeed protection system reaches or exceeds a predetermined value.

12. A method according to claim 11, wherein the number of consecutive starts in manual mode without testing is counted by means of a counter that is reinitialized each time a test is performed, whether starting in manual mode or in automatic mode.

* * * * *